(12) United States Patent
Shuey

(10) Patent No.: US 6,505,864 B1
(45) Date of Patent: Jan. 14, 2003

(54) FABRICATED OVAL DUCT CONNECTOR

(75) Inventor: Alan B. Shuey, Monongahela, PA (US)

(73) Assignee: Ductmate Industries, Inc., East Monongahela, PA (US)

( * ) Notice: Subject to any disclaimer, the term of this patent is extended or adjusted under 35 U.S.C. 154(b) by 0 days.

(21) Appl. No.: 09/898,423

(22) Filed: Jul. 3, 2001

(51) Int. Cl.$^7$ ............................................. F16L 23/00
(52) U.S. Cl. ...................... 285/364; 285/363; 285/415; 285/424
(58) Field of Search ................................. 285/364, 363, 285/368, 412, 414, 415, 424, 406

(56) References Cited

U.S. PATENT DOCUMENTS

| | | | | |
|---|---|---|---|---|
| 3,198,561 A | * | 8/1965 | Witt ............................ | 285/364 |
| 4,133,566 A | * | 1/1979 | Miller ...................... | 285/364 X |
| 5,103,549 A | * | 4/1992 | Meinig et al. .............. | 29/525.1 |
| 5,129,690 A | * | 7/1992 | Meinig et al. ............... | 285/363 |
| 5,133,580 A | * | 7/1992 | Meinig ......................... | 285/363 |
| 5,135,270 A | * | 8/1992 | Arnoldt et al. .......... | 285/424 X |
| 5,378,028 A | * | 1/1995 | Issagholian-Havai et al. | 285/424 X |
| 6,026,521 A | * | 2/2000 | Atkins ......................... | 285/415 |
| 6,315,335 B1 | * | 11/2001 | Seedorff ...................... | 285/415 |

* cited by examiner

Primary Examiner—Lynne H. Browne
Assistant Examiner—David E. Bochna
(74) Attorney, Agent, or Firm—Paul A. Beck & Associates

(57) ABSTRACT

A fabricated connector for oval shaped cross section ducts is provided. The fabricated connector has two oval shaped connector elements, each of which are formed from two semi-circular rings to which universal connectors are permanently affixed on each end of the semi-circular rings by the manufacturer. The semi-circular rings with universal connectors attached are then shipped to the field where angle pieces are inserted and fixed between the universal connectors of the two semi-circular rings to form the precise shape of oval connector desired.

16 Claims, 5 Drawing Sheets

FABRICATED OVAL DUCT CONNECTOR

BACKGROUND OF THE INVENTION

1. Field of the Invention

This invention relates to a fabricated connector for connecting the ends of a pair of oval duct sections and more particularly to a fabricated connector that can be tailored to fit the precise dimensions of the oval duct.

2. Description of the Prior Art

Oval ducts, that is ducts having an oval cross-section, have been utilized in the heating, ventilating and air conditioning field for many years. Sections of oval ducts are connected end-to-end. Various types of connectors have been utilized for this purpose.

Examples of oval duct connectors that have been manufactured and utilized are disclosed in U.S. Pat. Nos. 5,103,549, 5,129,690 and 5,135,270, all of which patents are assigned to the assignee of this invention. All of the duct connectors shown in the foregoing patents have been commercially successful and are more elaborate than the duct connector of the present invention which is more economical to manufacture and utilize.

SUMMARY OF THE INVENTION

The present invention provides a connector for connecting two adjacent sections of oval cross-section gas ducts which includes a pair of identical oval shaped connector elements, each element being adapted to be sealingly secured to an end of a section of gas duct having an oval cross section. Each of the elements include two semi-circular rings having a flat annular surface and an upstanding annular flange extending radially outwardly from the flat annular surface. Each of the semi-circular rings have two universal connectors formed separately from the semi-circular rings that are thereafter permanently affixed to the ends of the semi-circular rings. A pair of angle pieces having identical lengths are fixed to the universal connectors to form one of the oval shaped connector elements. The angle pieces are selected by length or cut to precise lengths to accommodate the particular shape of the oval cross section duct. The angle pieces have flat sections and upstanding flange walls to match the flat annular surfaces and upstanding annular flanges of the semi-circular rings. Each of the oval shaped connector elements is connected to one of the ends of the oval duct. A gasket is positioned between the flange walls of the oval shaped connector elements and the two oval shaped connector elements are connected to each other so that a compressive force is exerted on the gasket to seal the oval shaped connector elements to each other and prevent leakage of gas between them.

The semi-circular rings are preferably roll formed from flat stock and the complete ring is produced on the roll former. The ring is then cut along its diameter into two equal pieces to form the semi-circular rings. Universal connectors are connected permanently to each end of the semi-circular rings at the place of manufacture. The universal connectors are permanently connected by means of welding to the ends of the rings.

Accordingly, an object of the present invention is to provide an economical fabricated connector for oval cross-section ducts that can be completed in the field to obtain a precise fit for the ducts.

Another object of the present invention is to provide an oval duct connector that has readily fabricated parts that do not require any exotic manufacturing techniques for their formation.

These and others objects of the present invention will be more completely disclosed and described in the following specification, the accompanying drawings and the appended claims.

BRIEF DESCRIPTION OF THE DRAWINGS

FIG. 2 is taken along line II—II of FIG. 1 but includes two connector elements and a bolt and gasket rather than only the one element shown in FIG. 1.

DESCRIPTION OF THE PREFERRED EMBODIMENT

Figure 1:
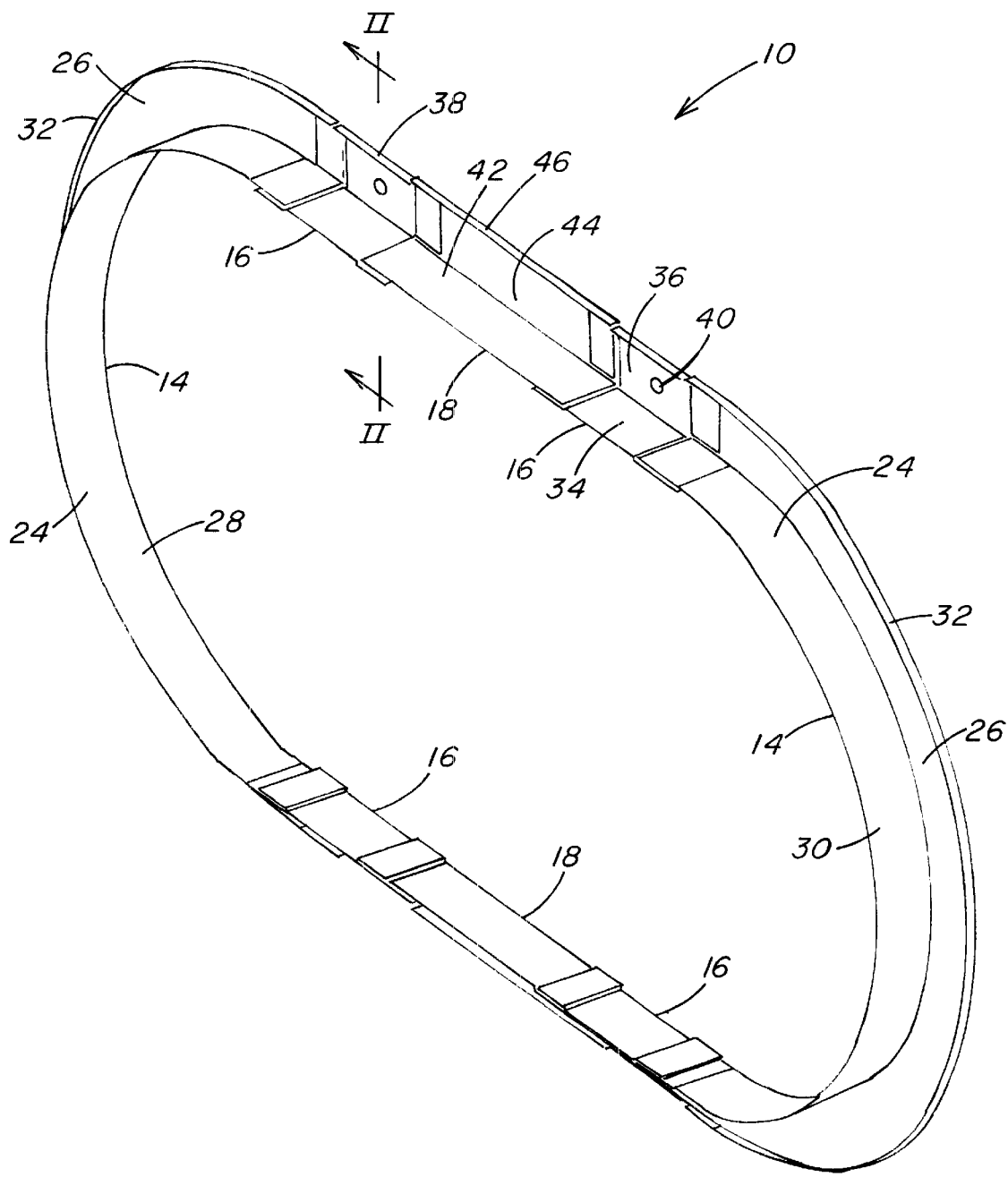
FIG. 1 is a perspective view of one element of the connectors of the present invention.

Referring to the drawings, there is shown generally at 10 an oval shaped connector element, two of which elements 10 form a connector 12 (see FIG. 2) for connecting the ends of oval shaped ducts to each other. Each connector 12 requires two identical oval shaped elements 10.

Figure 2:
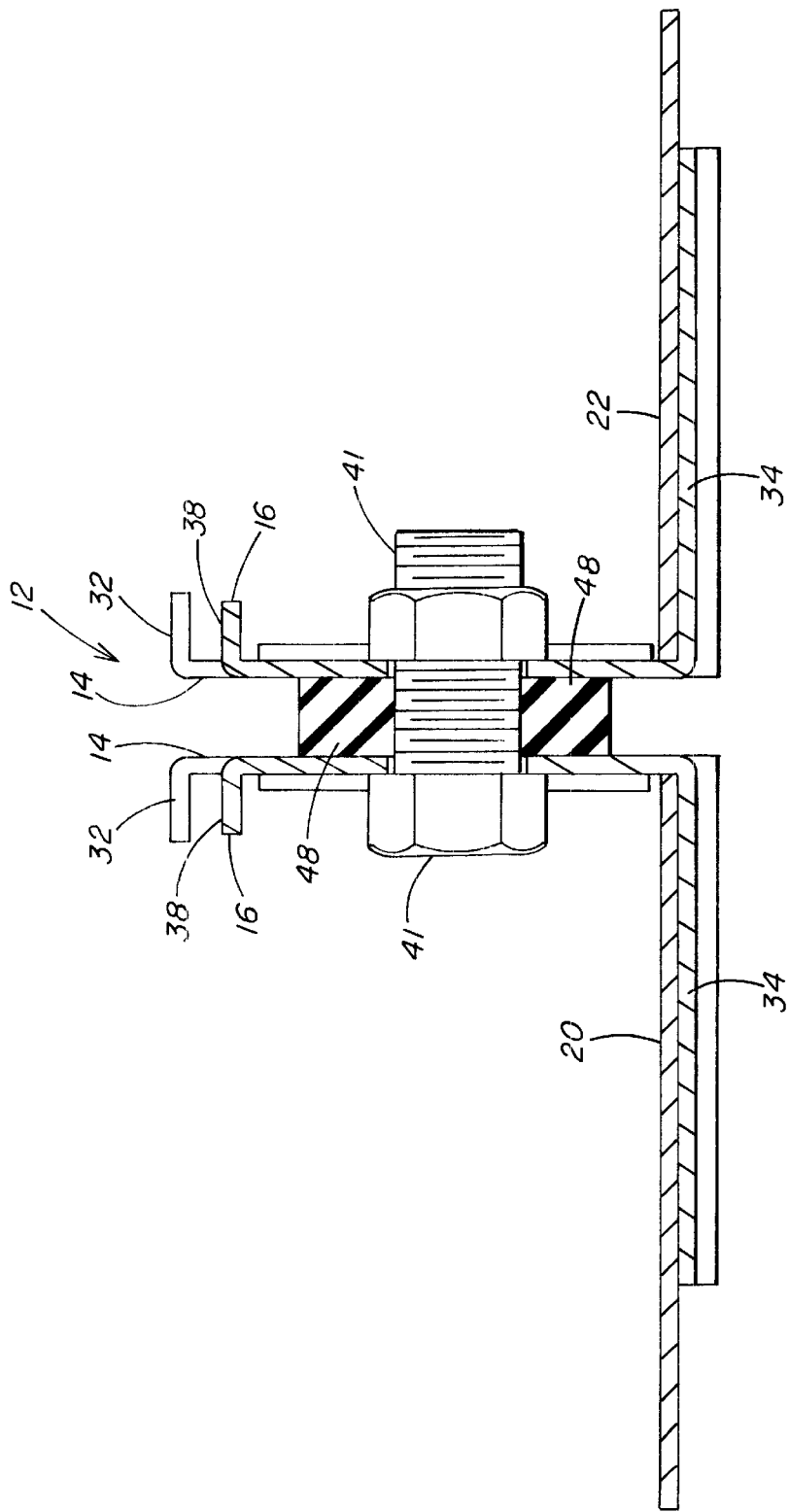
FIG. 2 is a sectional view illustrating how two elements of the present invention combine to form a connector to connect the ends of ducts.
Figure 3:
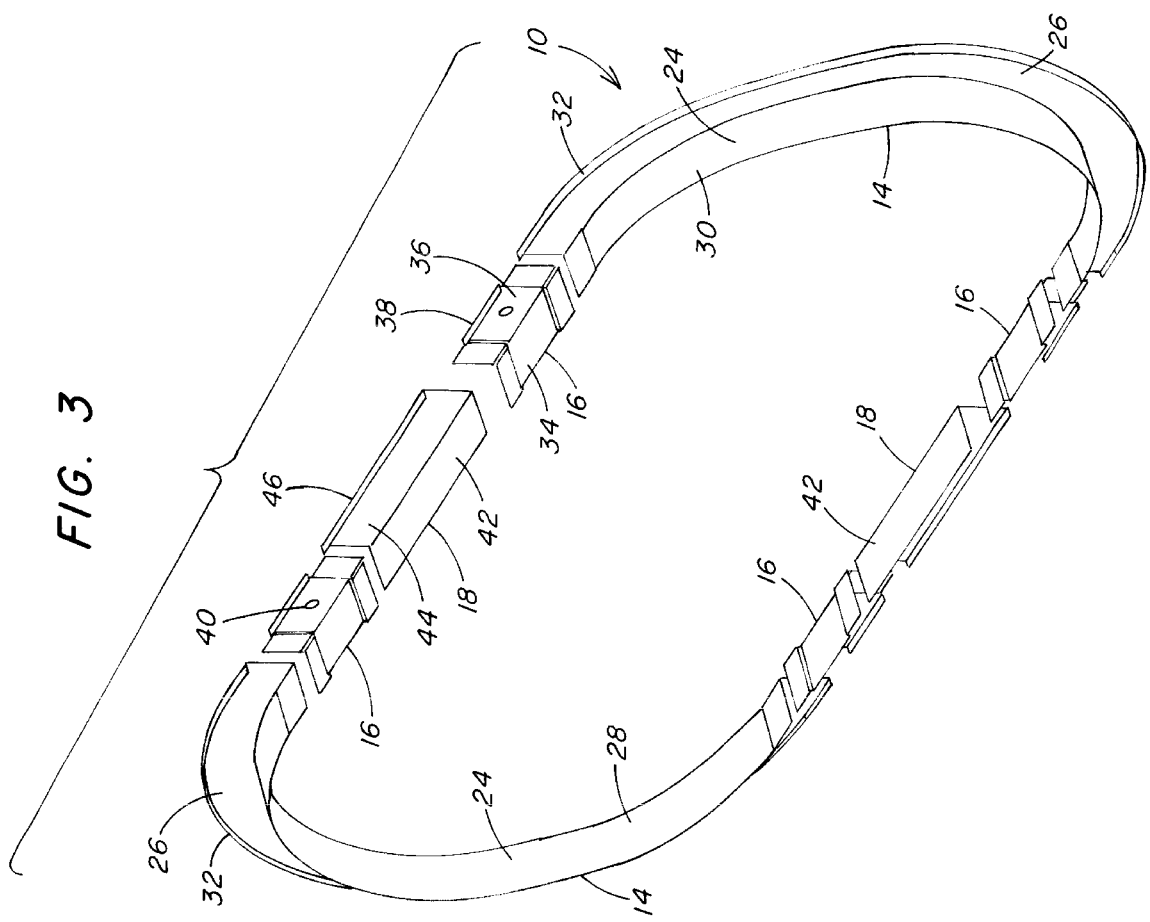
FIG. 3 is an exploded view of the element of FIG. 1.

The oval shaped connector element 10 is formed from two semi-circular rings 14, four universal connectors 16 and two angle pieces 18. As shown in FIG. 2, connector elements 10 are inserted inside the end of the respective oval duct sections 20 and 22.

Each of the semi-circular rings 14 has a flat annular surface 24 and an upstanding flange 26 extending radially from surface 24. The flat annular surface 24 has an inner annular surface 28 and an outer annular surface 30. Tab 32 is formed on the end of upstanding flange 26 and is a short piece of metal that extends rear-wardly from flange 26 in a direction parallel to flat annular surface 24 of rings 14.

Figure 4:
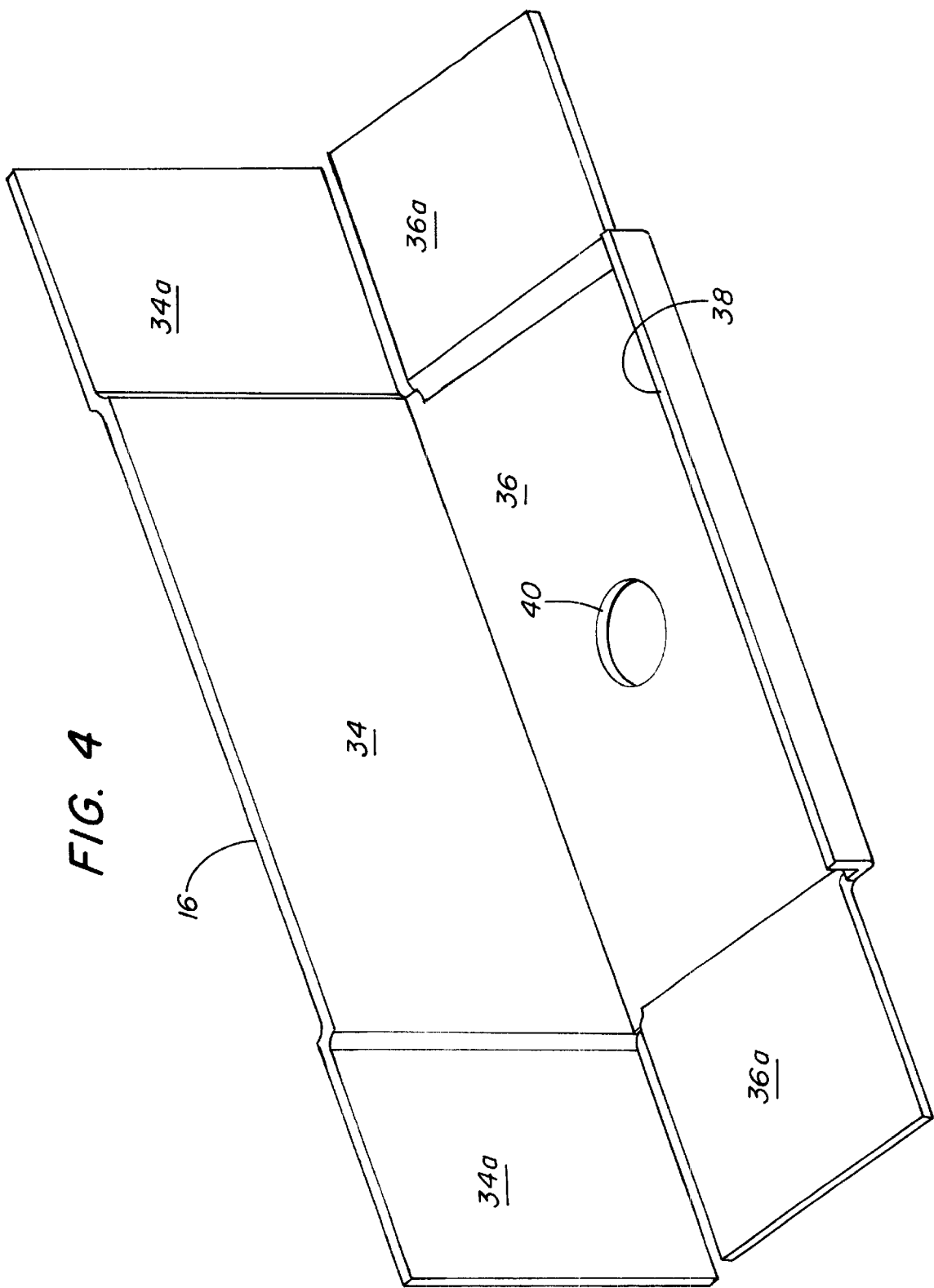
FIG. 4 is a detailed perspective view of one of the universal connectors utilized in the present invention.

As best seen in FIG. 4, universal connector 16 has a flat surface 34 and a flange 36 extending at right angles to flat surface 34. Surface offsets 34(a) and 36(a) are portions of the flat surface 34 and flange 36 respectively that are offset from the surface 34 and flange 36 by an amount equal to thickness of the stock from which universal connector 16, the semi-circular rings 14 and the angle pieces 18 are formed. Universal connector 16 also has a hole 40 formed in the flange 36 so that two universal connectors 16 from different oval shaped elements 10 may be bolted to each other by bolts 41 (FIG. 2).

Angle pieces 18 have a flat surface 42 and a flange 44 extending at right angles to the flat surface 42. Formed on the universal connector 16 and on the angle pieces 18 are tabs 38 and 46, respectively and tabs 38 and 46 are bent rear-wardly from flange 36 of universal connector 16 and the flange 44 of angle piece 18 similar to the tabs 32 formed on semi-circular ring 14. The tabs 32 on semi-circular rings 14, the tabs 38 on universal connectors 16 and the tabs 46 on angle pieces 18 permit cleats (not shown) to be utilized to connect oval shaped connector elements 10 if desired.

As previously stated, the element 10 is sealingly affixed to the end of an oval shaped duct. To connect the connector 10 to the end of the duct, a mastic that seals the pieces together is applied to annular outer surface 30 of the semi-circular rings 14 and to the corresponding flat surface 34 on universal connector 16 and to the flat surface 42 on the angle pieces 18. The oval shaped connector element is then inserted into the end of the duct and secured by screws, rivets, or welding. After the connectors 10 are secured onto the duct, connectors 10 are placed adjacent to one another and a gasket 48 (see FIG. 2) is placed between them and the oval shaped connector elements 10 are then drawn together with the use of bolts through hole 40 in universal connector 16 or by the use of cleats (not shown) positioned over tabs 32, 38 and 46. Drawing the two oval shaped connector elements 10 toward each other exerts a compressive force on gasket 48 which prevents gas leakage out of the adjacent ends of the oval shaped duct sections.

Because of the offsets 36(a) on universal connector 16, flange 26 on semi-circular rings 14 and the flange 36 on universal connector 16 and the flange surface 44 on angle pieces 18 all fall on a continuous flat surface so that the gasket 48 is positioned precisely against a common flat surface. In a similar manner, the offsets 34(a) permit the outer annular surface 30 of semi-circular rings 14 to align precisely with flat surface 34 on universal connector 16 and the flat surface 42 on angle pieces 18.

Figure 5:
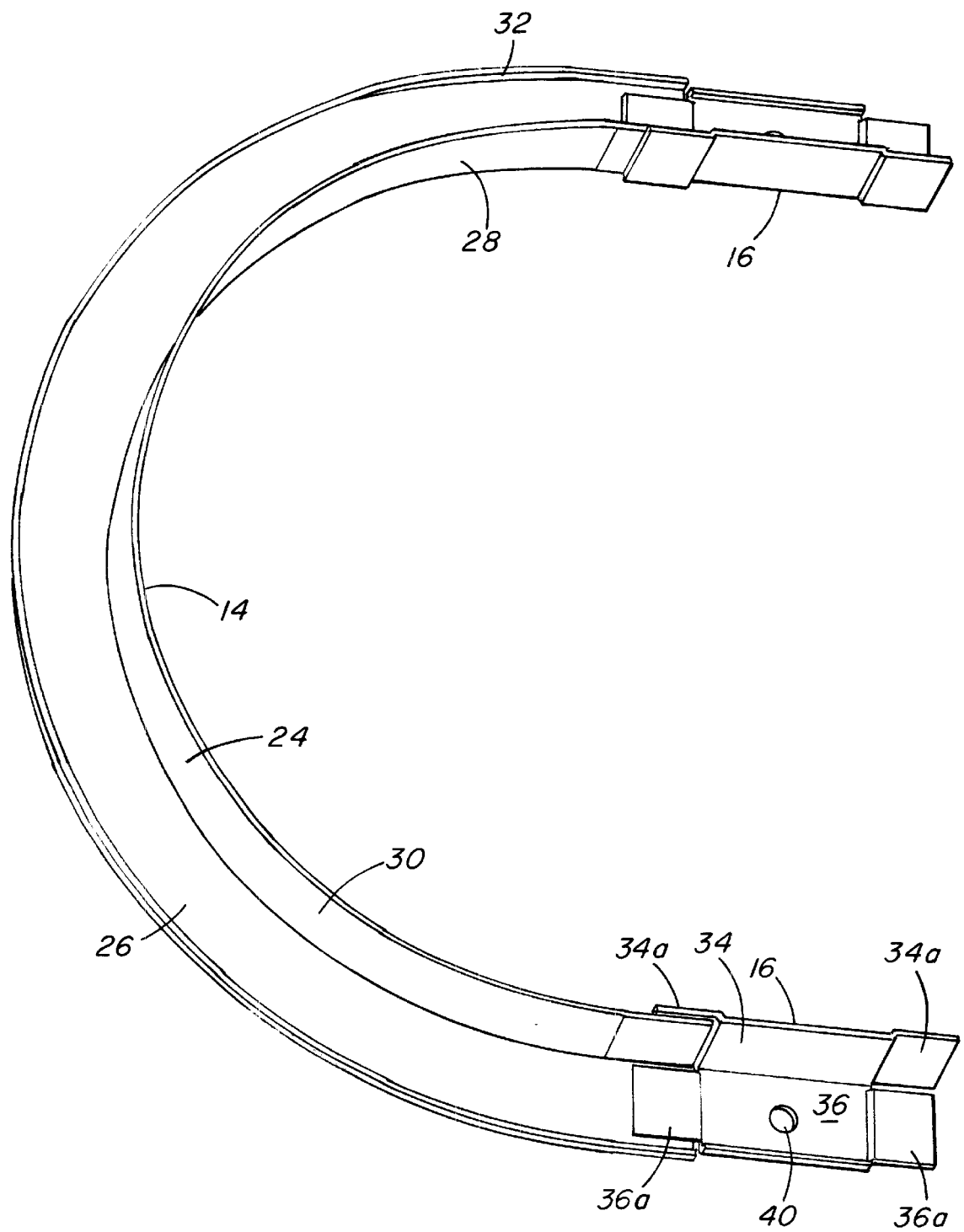
FIG. 5 is a component of the connector element of FIG. 1 with the semicircular ring connected to the universal connectors at its ends.

The oval shaped connector elements 10 of the present invention are shipped from the manufacturer to the field with a universal connector 16 permanently attached to each end of semi-circular ring 14 as shown in FIG. 5. This component of one semi-circular ring 14 and two universal connectors 18 as shown in FIG. 5 may be stacked for shipping and provides the basic unit for forming the oval shaped connector element 10. In the field, the installer selects angle pieces 18 of an appropriate length or cuts the angle pieces 18 to a length to fit the particular duct sections that he desires to connect to each other. The oval shaped connector element 10 is completed in the field by connecting of the components shown in FIG. 5 with appropriate angle pieces 18 by welding, riveting or with metal screws. The resulting oval shaped connector element 10 is shown in FIG. 1.

According to the provisions of the patent statutes, I have explained the principle, preferred construction, and mode of operation of my invention and have illustrated what I now consider to represent its best embodiment. However, it should be understood that, within the scope of the appended claims, the invention may be practiced otherwise then as specifically illustrated and described.

I claim:

1. A connector for connecting two adjacent sections of oval cross-section gas ducts comprising:
    a pair of identical oval shaped connector elements, each element adapted to be sealingly secured to an end of a section of gas duct having an oval cross-section;
    each of said elements comprising two semi-circular rings having a flat annular surface and an upstanding annular flange extending radially outwardly from said flat annular surface;
    each of said semi-circular rings having universal connectors formed separately from said semi-circular rings and thereafter permanently affixed to said semi-circular rings;
    a pair of angle pieces having identical lengths fixed to said universal connectors to form one of said oval shaped connector elements; said angle pieces being selected for their lengths to accommodate the particular shape of said oval cross-section duct;
    said angle pieces having flat sections and upstanding flange walls to match the flat annular surfaces and upstanding annular flanges of said semi-circular rings;
    said universal connectors having offset surfaces to receive said semi-circular rings and said angle pieces so that when said semi-circular rings and said angle pieces are attached to said universal connectors, continuous surfaces are formed on said connector;
    means to connect each of said oval shaped connector elements to ends of said ducts;
    gasket means positioned between the flange walls of said oval shaped connector elements; and
    means to connect said oval shaped connector elements to each other and to exert a compressive force on said gasket means to seal said oval shaped connector elements to each other to prevent leakage of gas between them.

2. The connector of claim 1 wherein said semi-circular rings are formed as complete circles on a roll forming machine and are then cut into two semi-circular rings.

3. The connector of claim 1 wherein said semi-circular rings, said universal connectors and said angle pieces all have a tab extending rearwardly from mating flange surfaces of said connector elements.

4. The connector of claim 1 wherein said universal connectors are affixed to each end of said semi-circular rings by the manufacturer of said connector before said connector leaves the manufacturing facility and said angle pieces are connected to said universal connectors by duct assemblers in the field.

5. The connector of claim 1 wherein said universal connectors are welded to said semi-circular rings.

6. A component of a connector for connecting two adjacent sections of oval cross-section gas ducts comprising:
    a semi-circular ring formed by roll-forming a complete ring and thereafter cutting said complete ring into two pieces; said semi-circular ring having a flat annular portion with an inner annular surface and an outer annular surface and an upstanding annular flange with an engaging surface and a rear surface;
    a universal connector permanently affixed to each end of said semi-circular ring; said universal connector having a flat portion that registers with said semi-circular ring flat annular portion and an upstanding flange that registers with said semi-circular ring annular flange; and
    each of said universal connectors having surface offsets at the ends of said universal connectors with the offsets on said flat portion being below the surface so that when said universal connector is connected to said semi-circular ring, said universal connector flat portion forms a continuous surface with said semi-circular ring flat annular portion outer annular surface and with the offsets on said upstanding flange being away from said flange engaging surface so that when said universal connector is connected to said semi-circular ring, said universal connector upstanding flange forms a continuous surface with said semi-circular ring upstanding annular flange engaging surface.

7. The component of claim 6 wherein said universal connectors are welded to said semi-circular ring.

8. The component of claim 6 wherein said semi-circular ring and said universal connectors each have a tab extending rearwardly from the engaging surface of said semi-circular ring upstanding annular flange.

9. The component of claim 8 wherein said tabs may be utilized to receive connecting cleats.

10. The component of claim 6 wherein each of said universal connectors has a hole formed in its upstanding flange to receive a bolt.

11. A connector for connecting two adjacent sections of oval cross-section gas ducts comprising:

a pair of identical oval shaped connector elements, each element adapted to be sealingly secured to an end of a section of gas duct having an oval cross section;

each of said elements comprising two semi-circular rings formed by roll forming a complete ring and thereafter cutting said complete ring into two pieces; each of said semi-circular rings having a flat annular portion with an inner annular surface and an outer annular surface and an upstanding annular flange with an engaging surface and a rear surface;

each of said semi-circular rings having universal connectors formed separately from said semi-circular rings and thereafter permanently affixed to said semi-circular rings; each of said universal connectors having a flat surface that registers with said semi-circular ring flat annular portion and an upstanding flange that registers with said semi-circular ring annular flange;

each of said universal connectors having surface offsets at each end with the offsets on said flat portion being below the surface so that when said universal connector is connected to said semi-circular ring, said universal connector flat portion forms a continuous surface with said semi-circular ring flat annular portion outer annular surface and with the offsets on said upstanding flange being away from said flange engaging surface so that when said universal connector is connected to said semi-circular ring, said universal connector upstanding flange forms a continuous surface with said semi-circular ring upstanding annular flange engaging surface;

a pair of angle pieces having identical lengths fixed to said universal connectors to form one of said oval shaped connector elements; said angle pieces being selected for their lengths to accommodate the particular shape of said oval cross-section duct; said angle pieces when secured to said universal connector surface offsets forming a continuous surface with said semi-circular ring flat annular portion outer annular surface and a continuous surface with said semi-circular ring upstanding annular flange engaging surface;

means to connect each of said oval connector elements to ends of said ducts;

gasket means positioned between the engaging surfaces of said upstanding flange walls of said connector elements; and means to connect said oval shaped connector elements to each other and to exert a compressive force on said gasket means to seal said oval shaped connector elements to each other to prevent leakage of gas between them.

12. The connector of claim 11 wherein said semi-circular rings, said universal connectors and said angle pieces all have a tab extending rear-wardly from mating flange surfaces of said connector elements.

13. The connector of claim 11 wherein said universal connectors are affixed to each end of said semi-circular rings by the manufacturer of said connectors before said connectors leave the manufacturing facility and said angle pieces are connected to said universal connectors by duct assemblers in the field.

14. The connector of claim 11 wherein said universal connectors are welded to said semi-circular rings.

15. The connector of claim 11 wherein each of said universal connectors has a hole formed in its upstanding flange to receive a bolt.

16. The connector of claim 11 wherein the continuous surface of the semi-circular ring flat annular portion outer annular surface and the corresponding surfaces of said universal connectors and said angle pieces contact the inner surface of the end of the oval duct.

* * * * *